(12) United States Patent  
Kagan

(10) Patent No.: US 9,131,672 B1  
(45) Date of Patent: Sep. 15, 2015

(54) REMOTE-CONTROLLED FISHING BOAT HAVING FISHING LINES WITH LURES EXTENDED THERE FROM

(76) Inventor: Davis Kagan, Phoenix, AZ (US)

( * ) Notice: Subject to any disclaimer, the term of this patent is extended or adjusted under 35 U.S.C. 154(b) by 603 days.

(21) Appl. No.: 13/488,631

(22) Filed: Jun. 5, 2012

(51) Int. Cl.
*A01K 89/00* (2006.01)

(52) U.S. Cl.
CPC ..................................... *A01K 89/00* (2013.01)

(58) Field of Classification Search
USPC .................................................... 43/26.1, 4.5
See application file for complete search history.

(56) References Cited

U.S. PATENT DOCUMENTS

| | | | | |
|---|---|---|---|---|
| 3,816,954 A * | 6/1974 | Bissonette | .................... | 43/43.12 |
| 5,165,193 A * | 11/1992 | Dankwardt | ..................... | 43/26.1 |
| 5,867,932 A * | 2/1999 | Reiger | .......................... | 43/43.13 |
| 6,122,852 A * | 9/2000 | Mechling, IV | ..................... | 43/4 |
| 7,213,363 B2 * | 5/2007 | Lieb | .............................. | 43/43.13 |
| 7,322,872 B2 * | 1/2008 | Butler et al. | ..................... | 446/57 |
| 7,748,156 B2 * | 7/2010 | Blum | ............................. | 43/26.1 |
| 7,854,087 B1 * | 12/2010 | Pervez | ............................ | 43/26.1 |
| 8,154,953 B1 * | 4/2012 | Sims et al. | ...................... | 367/96 |
| 8,627,593 B1 * | 1/2014 | Schepp et al. | ................. | 43/26.1 |
| 2001/0005954 A1 * | 7/2001 | Hermanson | ..................... | 43/4.5 |
| 2008/0271357 A1 * | 11/2008 | Easterby | ........................ | 43/26.1 |
| 2014/0259863 A1 * | 9/2014 | Martinez | ......................... | 43/4.5 |

* cited by examiner

*Primary Examiner* — Christopher P Ellis

(57) ABSTRACT

The remote-controlled fishing boat having fishing lines with lures extended there from includes a remote controlled air-driven boat to drive at least one baited hook or lure around within a body of water. The remote-controlled fishing boat includes at least one clothespin that grabs onto a fishing line, and pulls the fishing line and lure behind said boat while a fishing rod and reel is located outside of a body of water and adjacent to an end user. Once a fish is hooked, the corresponding clothespin shall release the fishing line, and said end user shall reel in the hooked fish. The remote-controlled fishing boat includes two fans rotatable engaged atop of poles, and which rotate to steer and propel said boat. The remote control may include a bracket that supports the remote control on the fishing rod.

9 Claims, 7 Drawing Sheets

REMOTE-CONTROLLED FISHING BOAT HAVING FISHING LINES WITH LURES EXTENDED THERE FROM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of remote-controlled boats, more specifically, a remote controlled boat that is specifically adapted for towing fishing lines with lures extended there from.

B. Discussion of the Prior Art

As will be discussed immediately below, no prior art discloses a remote controlled boat that is propelled via wind generated by two fans, and which includes clothespins on opposing sides for attachment of fishing lines therefrom; wherein the fans are mounted atop of poles located near a rear end of the boat, and which swivel thereon via servo motors in order to steer and propel said boat; wherein the fans and the servo motors shall collectively receive power from a powering communicates with the fans and servo motors wirelessly; wherein the fishing lines each include a lure or baited hook, which is dragged behind the remote-controlled boat; wherein the fishing lines may further extend to a fishing rod and reel held by an end user on dry ground adjacent to the body of water of use; whereupon a fish bites onto and is hooked via said lure, the corresponding clothespin shall release said fishing line, which is then reeled in via the fishing rod and reel located adjacent the end user; wherein the remote control may include a bracket that secures the remote control to the fishing rod.

The Easterby Patent Application Publication (U.S. Pub. No. 2008/0271357) discloses a method of fishing in which a radio controlled boat carries a fishing line to a remote area. However, the gripper is not a clothespin that releases a fishing line once the lure has hooked a fish, and from which the end user reels in said fish via a fishing rod and reel.

The Shen et al. Patent (U.S. Pat. No. 7,055,280) discloses a fishing bait delivery system in which a remotely controlled vehicle delivers a baited hook to a desired location. However, the fishing bait delivery system does not hold onto the fishing line until a lure is hooked to a fish at which point the fishing line becomes free, and is relied in via a fishing pole located on dry land.

The Daniel Patent (U.S. Pat. No. 6,389,732) discloses a radio controlled device in which a radio controlled vehicle carries a baited hook to a desirable fishing location. However, the baited hook is not able to become disengaged with the vehicle upon hooking a lure to a fish via a clothespin.

The Kimura Patent (U.S. Pat. No. 6,263,611) discloses a radio controlled fishing float that carries a baited hook to a desirable fishing location. Again, the baited hook or lure does not disconnect from the fishing float via a clothespin.

The Kashani et al. Patent (U.S. Pat. No. 5,361,530) discloses a remote controlled fishing line carrier. Again, the fishing line carrier is permanently affixed to the fishing line, and does not become disengaged upon hooking a fish onto a baited hook or lure.

The Wilson Patent (U.S. Pat. No. 5,168,651) discloses a floating fishing apparatus having a flashing light to indicate a fish strike. However, the apparatus is not a remote controlled boat that drives the lure around a body of water and disconnects from said lure upon hooking a fish, and at which point a fishing rod and reel is used to reel in the hooked fish.

The Fedora et al. Patent (U.S. Pat. No. 5,154,016) discloses a remote controlled angling device that includes a light. However, the angling device does not rely on a clothespin to disconnect a radio controlled boat from a fishing line, fishing lure, and hooked fish.

While the above-described devices fulfill their respective and particular objects and requirements, they do not describe a remote controlled boat that is propelled via wind generated by two fans, and which includes clothespins on opposing sides for attachment of fishing lines therefrom; wherein the fans are mounted atop of poles located near a rear end of the boat, and which swivel thereon via servo motors in order to steer and propel said boat; wherein the fans and the servo motors shall collectively receive power from a powering means located elsewhere on said boat; wherein a remote control communicates with the fans and servo motors wirelessly; wherein the fishing lines each include a lure or baited hook, which is dragged behind the remote-controlled boat; wherein the fishing lines may further extend to a fishing rod and reel held by an end user on dry ground adjacent to the body of water of use; whereupon a fish bites onto and is hooked via said lure, the corresponding clothespin shall release said fishing line, which is then reeled in via the fishing rod and reel located adjacent the end user; wherein the remote control may include a bracket that secures the remote control to the fishing rod. In this regard, the remote-controlled fishing boat having fishing lines with lures extended there from departs from the conventional concepts and designs of the prior art.

SUMMARY OF THE INVENTION

The remote-controlled fishing boat having fishing lines with lures extended there from includes a remote controlled air-driven boat to drive at least one baited hook or lure around within a body of water. The remote-controlled fishing boat includes at least one clothespin that grabs onto a fishing line, and pulls the fishing line and lure behind said boat while a fishing rod and reel is located outside of a body of water and adjacent to an end user. Once a fish is hooked, the corresponding clothespin shall release the fishing line, and said end user shall reel in the hooked fish. The remote-controlled fishing boat includes two fans rotatable engaged atop of poles, and which rotate to steer and propel said boat. The remote control may include a bracket that supports the remote control on the fishing rod such that an end user may hold the fishing rod with the remote control thereon.

It is an object of the invention to provide a remote controlled boat that drives around a portion of a fishing line and baited hook or lure behind said boat until a fish bites and is hooked thereon, and after which the boat is disconnected from said fishing line via a clothespin, and the end user shall reel in the hooked fish via a respective rod and reel.

Another object of the invention is to provide at least one clothespin that is positioned near the rear of the boat, and which shall drag the lure or baited hook from behind the boat.

Another object of the invention is to provide a remote controlled boat that relies upon air propulsion via fans, which cannot be entangled with the fishing line as with a boat propeller.

An even further object of the invention is to provide a pair of fans that rotate about poles, which enable steering and propulsion of the boat.

Another object of the invention is to provide at least one lure that is dragged behind said boat, and which are collectively connected to a single fishing line that extends over to a single fishing rod and reel located adjacent an end user.

Another object of the invention is to provide a plurality of fishing lures that are individually connected to the fishing boat via a clothespin, and which includes a corresponsive fishing line that extends to a respective fishing rod and reel such that the number of lures corresponds with the number of rod and reels located adjacent the end user.

Another object of the invention is to provide a bracket that attaches the remote control onto the fishing rod such that an end user can hold the fishing rod with the remote control thereon so that the fishing line and boat can be maneuvered together.

These together with additional objects, features and advantages of the remote-controlled fishing boat having fishing lines with lures extended there from will be readily apparent to those of ordinary skill in the art upon reading the following detailed description of presently preferred, but nonetheless illustrative, embodiments of the remote-controlled fishing boat having fishing lines with lures extended there from when taken in conjunction with the accompanying drawings.

In this respect, before explaining the current embodiments of the remote-controlled fishing boat having fishing lines with lures extended there from in detail, it is to be understood that the remote-controlled fishing boat having fishing lines with lures extended there from is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the remote-controlled fishing boat having fishing lines with lures extended there from.

It is therefore important that the claims be regarded as including such equivalent construction insofar as they do not depart from the spirit and scope of the remote-controlled fishing boat having fishing lines with lures extended there from. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
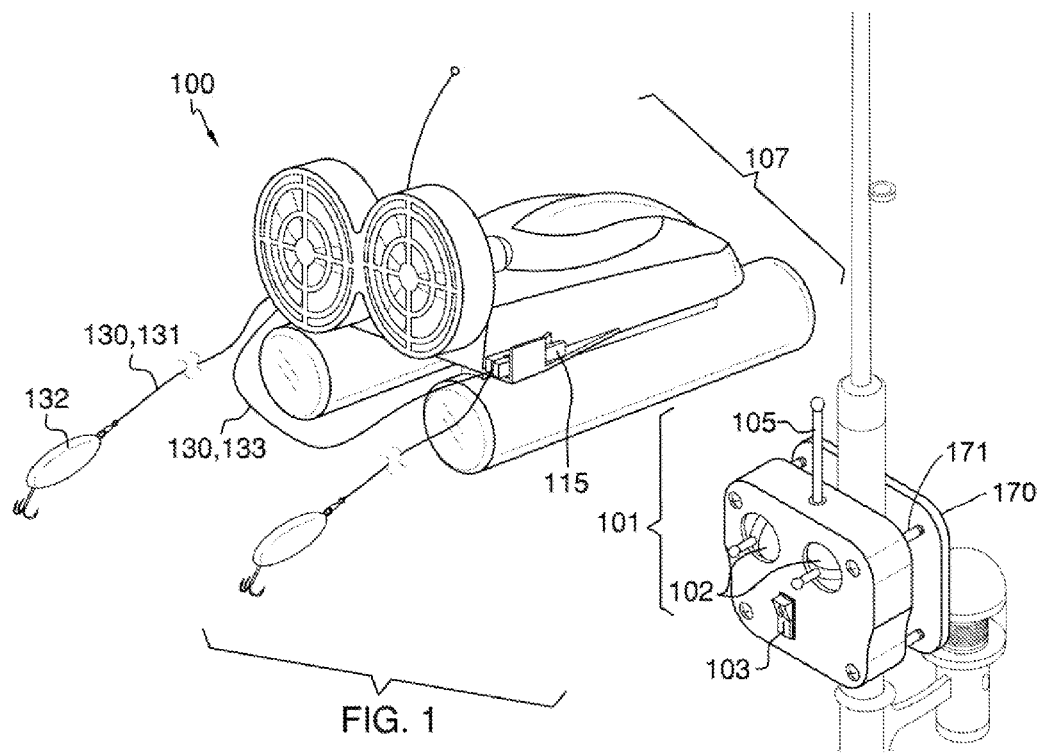
FIG. 1 illustrates a perspective view of the remote-controlled fishing boat in which a pair of fishing lures are extended from behind the fishing boat while depicting the bracket securing the remote control to the fishing rod.
Figure 2:
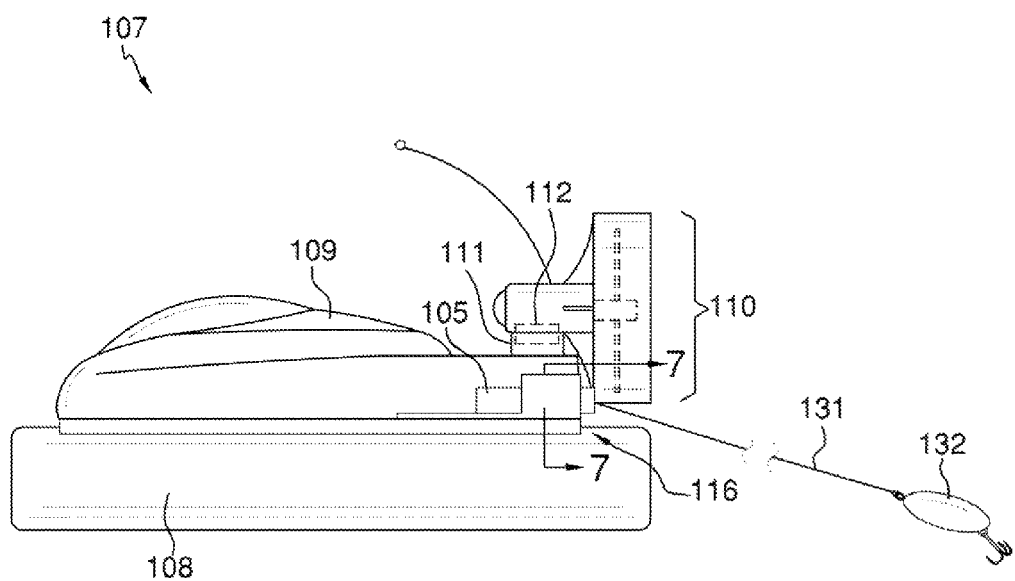
FIG. 2 illustrates a side view of the remote-controlled fishing boat by itself and with a fishing lure being dragged from behind said fishing boat via a clothespin.
Figure 3:
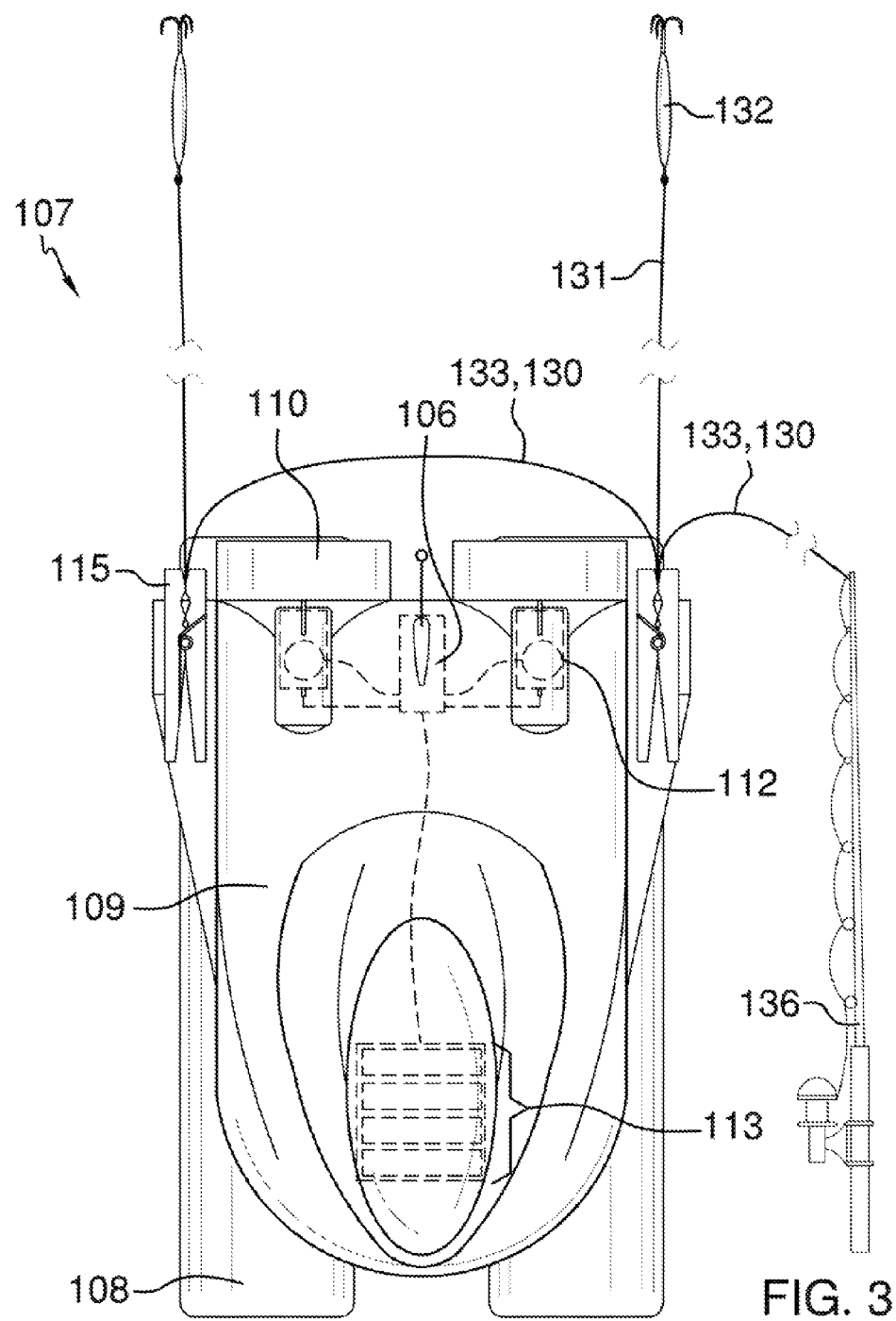
FIG. 3 illustrates a top view of the remote-controlled fishing boat in which clothespins are connected to a respective fishing line and lure being dragged from behind, and said lines are inter-connected and extend away to a fishing rod and reel located elsewhere.
Figure 4:
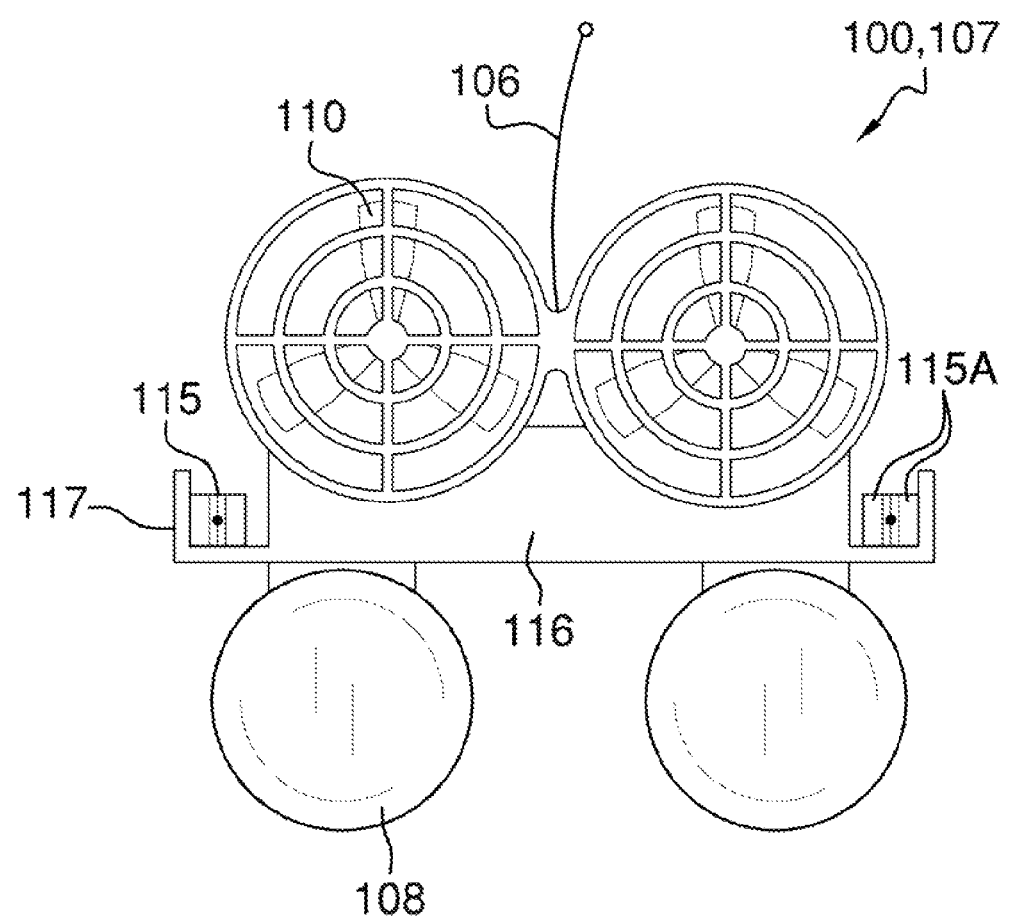
FIG. 4 illustrates a rear view of the remote-controlled fishing boat.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-7. A remote-controlled fishing boat having fishing lines with lures extended there from 100 (hereinafter invention) includes a remote control 101 having controls 102 and an on/off switch 103, and being able to transmit a wireless signal 104 via a transmitter 105, which communicates with a receiver 106 located on a remote-controlled boat 107.

The remote-controlled boat 107 includes at least one pontoon 108 atop of which a housing 109 is provided along with two fans 110. The fans 110 are each mounted to and rotatably engaged upon poles ill. The fans 110 are responsible for propelling and steering the remote-controlled boat 107. The fans 110 are rotated via servo motors 112, which connect between the fans 110 and the poles 111. The fans 110 and the servo motors 112 are each wired to the receiver 106, which in turn is wired to a powering means 113 located inside of the housing 109. The powering means 113 is comprised of at least one battery, which may be rechargeable. It shall be noted that the receiver 106 is responsible for one-way incoming communication with the remote control 101, and also for controlling the output of the fans 110 and the servo motors 112. Moreover, the receiver 106 is responsible for controlling the electricity flow from the powering means 113 to the fan(s) 110 and/or servo motor(s) 112.

The remote-controlled boat 107 includes at least one clothespin 115 that is secured to a rear end 116 of the remote-controlled boat 107. Moreover, the clothespin(s) 115 is positioned on a side 117 of the remote-controlled boat 107 thereby occupying a rear corner of the remote-controlled boat 107. The clothespin 115 is responsible for gripping onto a fishing line 130 such that a first portion 131 of the fishing line 130 extends and is dragged from behind the remote-controlled boat 107. The first portion 131 extends to and attaches with a fishing lure 132. As a side note, the term fishing lure 132 is being used to describe anything commonly associated with a baited hook or lure having at least one barbed hook thereon, and which is used to hook a fish 140 located in a body of water 150.

A second portion 133 of the fishing line 130 shall either (1) extend over and attach to an adjacent first portion 131, and from there extend to a fishing rod and reel 136, or (2) extend directly to said fishing rod and reel 136. In referring to FIGS. 5 and 6, the invention 100 can be adapted for use with a single fishing rod and reel 136 (FIG. 5) or a plurality of fishing rod and reels 136 that correspond with the number of fishing lures 132 being dragged from behind the remote-controlled boat 107.

It shall be noted that the main purpose of the invention 100 is to propel and drive the fishing lure(s) 132 around the body of water 150, and until the fish 140 is hooked thereon. After hooking the fish 140, the clothespin(s) 115 disconnects the remote-controlled boat 107 from the fishing line 130, and an end user 160 shall reel in the fish 140 via the fishing rod and reel 136.

Figure 7:
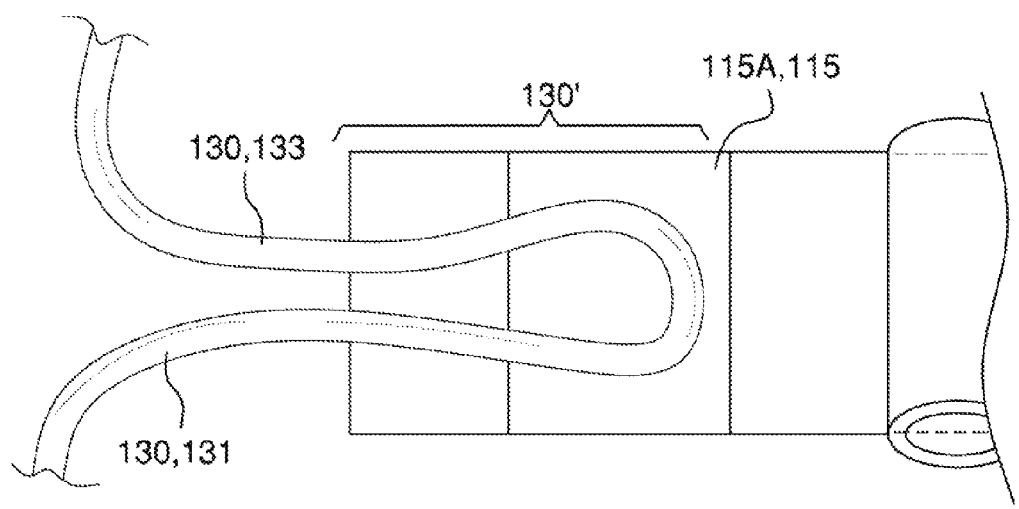
FIG. 7 illustrates a cross-sectional view along line 7-7 in FIG. 2, and detailing the fishing line held by the clothespin.

It should be noted that the use of the clothespin 115 is specific to the functionality of the invention 100 in that the clothespin 115 provides enough of a gripping force to hold onto the fishing line 130, but will become disconnected once the fish 140 is hooked onto the fishing lure 132. Referring to FIG. 7, detail is made as to the path of travel of the fishing line 130 in the clothespin 115, which forms a "U" 130' between opposing arms 115A of the clothespin 115.

Figure 5:
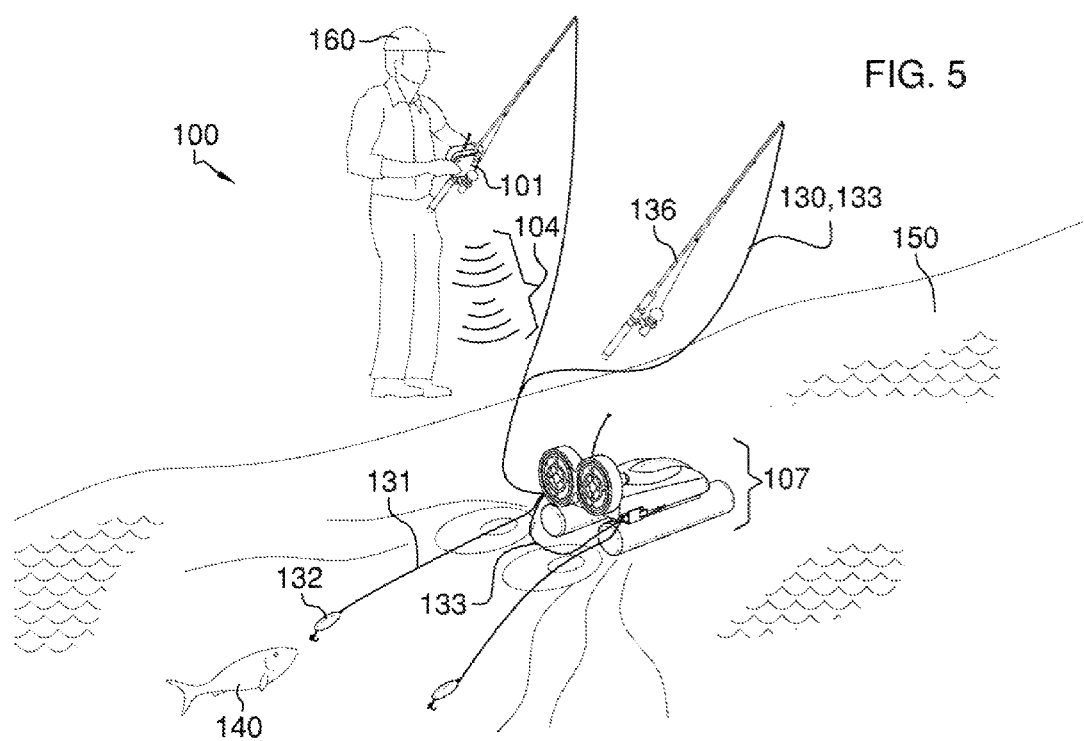
FIG. 5 illustrates a view of the remote-controlled fishing boat in use with a single rod and reel located adjacent to an end user operating the remote control.
Figure 6:
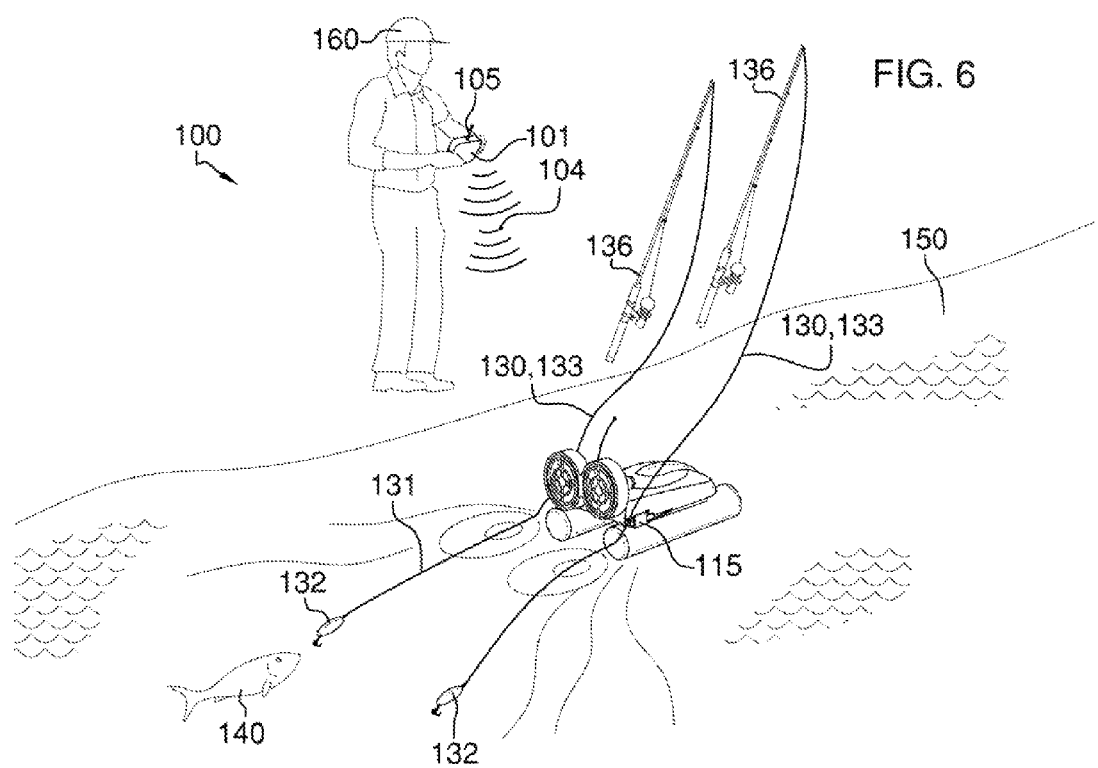
FIG. 6 illustrates a view of the remote-controlled fishing boat in use with multiple rods and reels corresponsive to the number of lures being dragged from behind the boat.

Referring to FIG. 1, the invention 100 may include a bracket 170 that secures the remote control 101 to the fishing rod and reel 136. The bracket 170 is designed to support the remote control 101 at the lower end portion of the fishing rod and reel 136. Furthermore, the bracket 170 enables the end user 160 to hold the fishing rod and reel 136 with the remote control 101 conveniently located thereto. Referring to FIG. 5, the end user 160 can alternatively hold onto the remote control 101 and simultaneously support and hold the fishing rod and reel 136. Either way the end user 160 can hold the fishing rod and reel 136 or the remote control 101, and the opposing component is being supported.

The bracket 170 may include a plurality of threaded members 171 that extend through the remote control 101, and screw into the bracket 170 thereby sandwiching the portion of the fishing rod and reel 136 there between.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A remote-controlled fishing boat comprising:
   a remote-controlled boat that includes at least one fan that can rotate atop of a pole located at a rear end of said remote-controlled boat in order to propel and steer said remote-controlled boat;
   wherein a remote control wirelessly transmits a signal to a receiver located on said remote-controlled boat in order to steer and drive said remote-controlled boat;
   wherein a plurality of clothespins are included on said remote-controlled boat, and which grips a fishing line, from which a first portion trails behind said remote-controlled boat to pull a fishing lure there behind;
   whereupon a fish bites and hooks onto said fishing lure, said fishing line becomes disconnected from the clothespin and said remote-controlled boat, and upon which a fishing rod and reel located outside of a body of water shall reel in said hooked fish;
   wherein the remote control includes controls, an on/off switch;
   wherein the remote-controlled boat includes at least one pontoon atop of which a housing is provided;
   wherein said fan is attached to a servo motor that is attached to said pole;
   wherein the fan and the servo motor are each wired to the receiver, which is wired to a powering means located on said remote-controlled boat;
   wherein the powering means comprises at least one battery;
   wherein the battery is rechargeable.

2. The remote-controlled fishing boat as described in claim 1 wherein the clothespins are located at a rear end of said remote-controlled boat.

3. The remote-controlled fishing boat as described in claim 2 wherein the clothespins are located on a side of the remote-controlled boat so as to situate at a rear corner of said remote-controlled boat.

4. The remote-controlled fishing boat as described in claim 3 wherein the fishing line includes a second portion that extends from the clothespin to said fishing rod and reel or connects to an adjacent first portion gripped at a corresponding clothespin, and which includes a second portion extending to said fishing rod and reel.

5. The remote-controlled fishing boat as described in claim 4 wherein a bracket secures the remote control to the fishing rod and reel; wherein the bracket and the remote control sandwich a portion of the fishing rod and reel there between.

6. A remote-controlled fishing boat comprising:
   a remote-controlled boat that includes at least one fan that can rotate atop of a pole located at a rear end of said remote-controlled boat in order to propel and steer said remote-controlled boat;
   wherein a remote control wirelessly transmits a signal to a receiver located on said remote-controlled boat in order to steer and drive said remote-controlled boat;
   wherein a plurality of clothespins are included on said remote-controlled boat, and which grips a fishing line forming a "U" shape therein, from which a first portion trails behind said remote-controlled boat to pull a fishing lure there behind;
   wherein the clothespins are located at a rear end of said remote-controlled boat;
   whereupon a fish bites and hooks onto said fishing lure, said fishing line becomes disconnected from the clothespin and said remote-controlled boat, and upon which a fishing rod and reel located outside of a body of water shall reel in said hooked fish;
   wherein the remote control includes controls, an on/off switch;
   wherein the remote-controlled boat includes at least one pontoon atop of which a housing is provided;
   wherein said fan is attached to a servo motor that is attached to said pole;

wherein the fan and the servo motor are each wired to the receiver, which is wired to a powering means located on said remote-controlled boat; wherein the servo motor rotates said fan in order to steer the remote-controlled boat;

wherein the powering means comprises at least one battery;

wherein the battery is rechargeable.

7. The remote-controlled fishing boat as described in claim 6 wherein the clothespins are located on a side of the remote-controlled boat so as to situate at a rear corner of said remote-controlled boat.

8. The remote-controlled fishing boat as described in claim 7 wherein the fishing line includes a second portion that extends from the clothespin to said fishing rod and reel or connects to an adjacent first portion gripped at a corresponding clothespin, and which includes a second portion extending to said fishing rod and reel.

9. The remote-controlled fishing boat as described in claim 6 wherein a bracket secures the remote control to the fishing rod and reel; wherein the bracket and the remote control sandwich a portion of the fishing rod and reel there between.

* * * * *